UNITED STATES PATENT OFFICE.

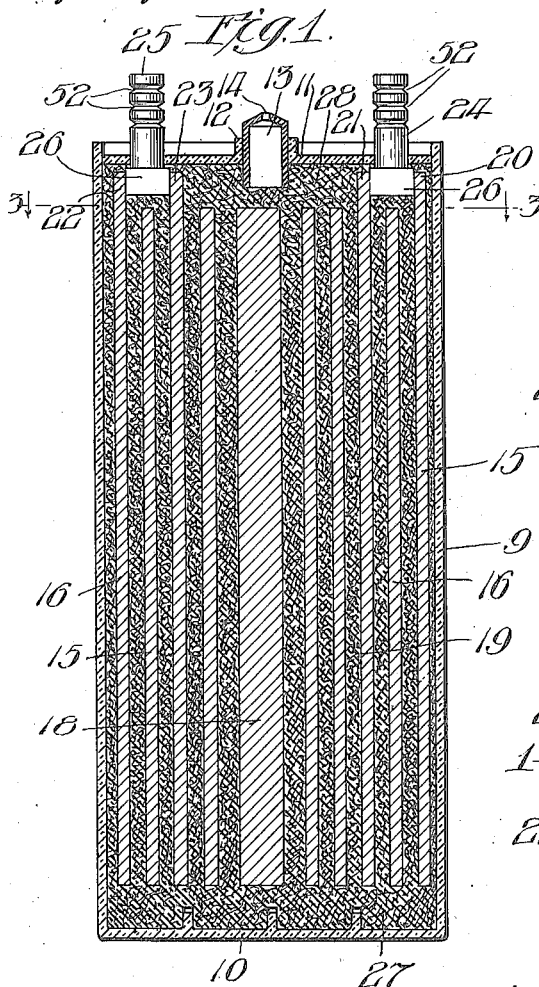
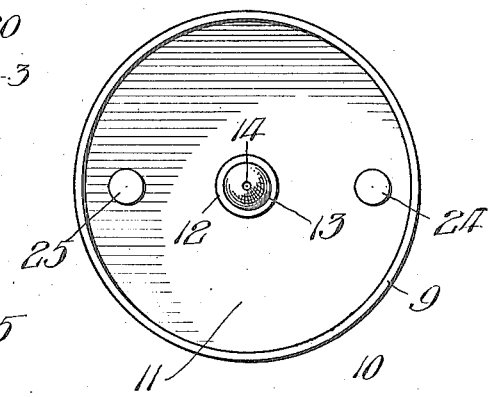
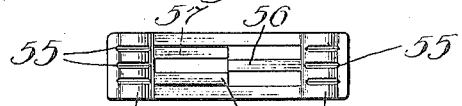
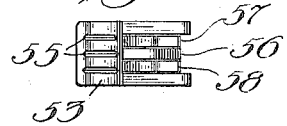
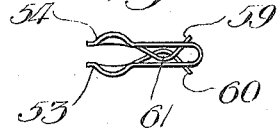

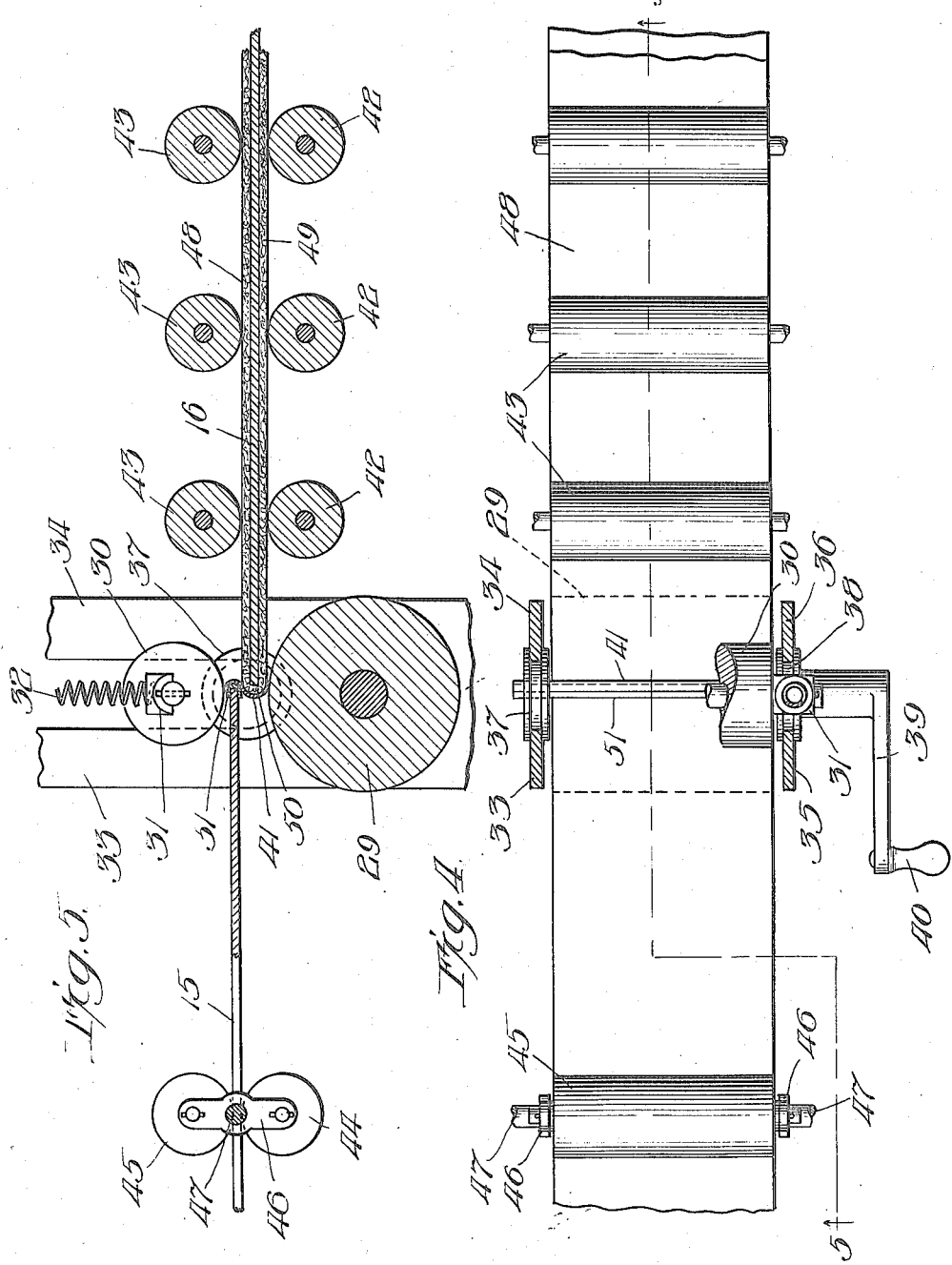

JULIUS BECKER, OF CHICAGO, ILLINOIS, ASSIGNOR TO JOHN P. MENTZER, OF CHICAGO, ILLINOIS.

STORAGE BATTERY.

1,269,778.               Specification of Letters Patent.       Patented June 18, 1918.

Application filed May 22, 1916. Serial No. 99,182.

*To all whom it may concern:*

Be it known that I, JULIUS BECKER, a citizen of the Swiss Confederation, residing at Chicago, in the county of Cook and State of Illinois, have invented certain new and useful Improvements in Storage Batteries, of which the following is a specification.

In the construction of storage batteries and the like, it is very necessary that a suitable form of separator be used between the positive and negative plates, which separator shall at all times maintain in itself a high degree of electrical resistance combined with the ability to absorb the electrolyte and to mechanically separate the plates in the proper manner. Various forms of separator have been devised in the past, but many of these are subject to deterioration under the influence of the electrolyte, so that in time short circuits are established between the plates.

It is very desirable, in the construction of the separators, to use a material which will readily absorb the electrolyte, so that the said electrolyte will at all times provide a satisfactory fluid connection between the positive and negative plates.

In the construction of batteries in which the plates are wound together in spiral or helical form, the separator should be of such material that it will readily bend or assume the proper configuration during the manufacture of a cell, so that after the plates have been spiraled together, the separating material will possess all of the desired characteristics. Such materials as card-board, paste-board, pulp in sheet form, etc., are objectionable for this class of work, for the reason that, although they may be twisted or curved during the rolling of the plates, still they will break down in time under the influence of the electrolyte, and thus produce the aforementioned short circuit connections. Furthermore, when the plates are spiraled or rolled together, with the use of paste-board or the like for the separating medium, the plates and separator will frequently roll together into such a compact mass that the electrolyte will not satisfactorily permeate the separator. The result is that in many cases the conductivity of the battery is very seriously impaired, besides which its ampere-hour capacity is reduced.

I have discovered the fact that glass wool and such materials are admirably adapted for use as separators in batteries of this type, for the reasons that the glass wool in itself possesses a high insulating capacity, and is not subject to deterioration or decomposition under the chemical influence of the electrolyte. Furthermore, the glass wool, being of a highly fibrous mass with the fibers running in every direction, permits the electrolyte to permeate its entire mass, so that at all times the electrolyte is enabled to provide an excellent electrical path between all portion of the plates or electrodes. In addition to this characteristic, the glass wool possesss high capillarity, so that there is a strong tendency for the electrolyte to distribute iself throughout the entire mass and all portions of the separator so constituted.

Another feature of my invention has to do with the manner in which the electrodes are rolled together.

Still another feature of the invention has to do with the provision of an improved form of terminal for the battery, and the provision of a satisfactory form of clip for connecting the wires to said terminals.

Other objects and uses of the invention will appear from a detailed description of the same which consists in the features of construction and combinations of parts hereinafter described and claimed.

Referring to the drawings:

Figure 1 shows a vertical section through one form of cell embodying the features of the present invention, the same being a section taken on line 1—1 of Fig. 3, looking in the direction of the arrows;

Fig. 2 shows a plan view of the cell shown in Fig. 1;

Fig. 3 shows a horizontal section taken on line 3—3 of Fig. 1, looking in the direction of the arrows;

Fig. 4 shows in plan view a simple form of mechanism for rolling the plates and separator together;

Fig. 5 shows a section taken on line 5—5 of Fig. 4, looking in the direction of the arrows;

Fig. 6 shows a side elevation of the improved form of clip;

Fig. 7 shows the blank from which the clip may be made; and

Fig. 8 shows a plan view of the clip of Figs. 6 and 7.

In the several figures, I have shown the features of my invention as being applied to a circular cell and one in which the positive and negative electrodes are rolled together. I wish it distinctly understood that certain features of the invention are not limited to use in circular cells, or cells of this kind, and that I do not so limit myself except as I may do so in the claims.

The cell is shown as being mounted within a circular cylindrical casing 9 having a bottom 10. This casing may be of sheet rubber or any other suitable material and may be of any one of a number of forms at present well known and in use. The upper end of the casing may be closed by a circular cap or cover 11 seating nicely within the upper end of the casing, said cap or cover being provided with a central opening surrounded by the upstanding flange 12. A vent cap 13 having the vent hole 14 seats down within the flange 12 in the manner which will be well understood from an examination of Fig. 1.

The electrodes are designated 15 and 16 respectively. They are shown as being rolled together, their inner ends 17 and 18 respectively being overlapped a slight distance as is well shown in Fig. 3. The separating material, such as glass wool or the like, 19, fills the space between the successive spirals of the electrodes, so that the said electrodes are properly separated on all points within the cell.

The electrode 15 has the upstanding lugs 20 and 21, and the electrode 16 has the upstanding lugs 22 and 23. The lugs on each electrode are so placed thereon that when the electrodes have been coiled together, the two lugs of each electrode occupy positions close together within two consecutive turns of the spiral. The terminal lug 24 is joined to the lugs 20 and 21 of the electrode 15, and the terminal lug 25 is joined to the lugs 22 and 23 of the electrode 16. For this purpose, each of said terminal lugs has a squared lower portion 26 which seats down between the adjacent lugs of the proper electrodes, to which lugs the terminal may be soldered or burned. It will be observed, from an examination of Fig. 1, that the various lugs stand at such an elevation above the main or body portions of their electrodes that there is no direct connection between any portion of each terminal and the opposite electrode.

The glass wool or separating material is wound or spiraled in between the successive convolutions of the electrodes, as will be well understood from an examination of Figs. 1 and 3. The glass wool preferably projects beyond the upper and lower edges of the electrodes, so that when the electrodes and glass wool separator have been wound together, and when the said parts are introduced into the container 9, the glass wool will fill in the lower portion 27 and the upper portion 28 of the container. Consequently, all portions of the interior of the container which are not occupied by the electrodes will be filled with the mass of glass wool. Inasmuch as this glass wool has a very open texture the electrolyte will provide ready electrical connection between the electrodes and will come into contact with substantially the entire faces of the electrodes. Furthermore, on account of the high capillary of the glass wool, the electrolyte will at all times distribute itself throughout substantially the entire body of the glass wool, to thereby maintain the entire surface of each electrode always in wet or moist condition. As a result of this fact, the tendency for the plates to sulfate will be very greatly reduced, besides which all portions of the cell will be worked up to their maximum capacity at all times.

I will now explain by reference to Figs. 4 and 5 one convenient method and form of mechanism for rolling together the electrodes and the glass wool. In the construction shown in the said Figs. 4 and 5, there is provided a stationary roller 29 in conjunction with a vertically movable roller 30 mounted above the same. The roller 30 has its journal sockets 31 under the compression of the springs 32, so that a suitable spring pressure is always exerted between the rollers 29 and 30.

At one side of the machine are a pair of vertical guides 33 and 34, and at the other side of the machine are the vertical guides 35 and 36. A grooved roller 37 works between the guides 33 and 34, and a grooved roller 38 works between the guides 35 and 36. The roller 38 has connected to it a crank 39 and handle 40, by means of which it may be rotated by the operator. In the face of the roller 37 is an S-shaped groove or slot adapted to receive an S-shaped plate 41 which extends between the grooved rollers 37 and 38. Upon driving the crank 39, the S-shaped plate 41 is caused to rotate. One of the electrodes 15 is fed in from one side of the machine, and the other electrode 16 is fed in from the other side. The electrode 16 travels between the lower rollers 42 and the upper rollers 43, which are mounted in pairs on fixed centers. On the other hand, the electrode 15 travels between the rollers 44 and 45 which are mounted on arms 46 swiveled on the axis 47. Consequently, the rollers 44 and 45 may tilt about the axis 47.

The electrode 16 is first laid between two layers of glass wool 48 and 49, or a single layer of the glass wool may be laid over the edge of the electrode 16, and extend along the two faces of the said electrode. The latter mode of operation is preferable in some respects, for the reason that it insures a complete incasing of the end of the electrode 16 by the glass wool 50. A wad of the glass wool 51 may be set over the end of the other electrode before the rolling operation commences; and it will be understood that the layers 48 and 59 of glass wool are preferably of greater width than the electrodes, so that, after the rolling operation has been completed, the glass wool will project beyond both ends of the completed spiral, so as to fill in the upper and lower portions of the casing in the manner previously described.

When the electrodes have been laid between the various rollers in the manner just explained, pressure is exerted upon them tending to move them inwardly toward the center of the machine, and simultaneously the crank 39 is driven so as to cause the S-shaped plate 41 to rotate. The result will be that the two electrodes with the incased glass wool will be coiled together to produce the desired result. After the coiling operation has been completed, the roller 30 may be raised upwardly, and then the rollers 37 and 38, with the S-shaped plate 41 and the coiled electrodes, may be lifted upwardly away from the roller 29. Thereafter the roller 37 may be removed from the S-shaped plate, and said plate may then be withdrawn in the other direction from between the inner end portions of the electrodes and glass wool.

Referring particularly to Fig. 1, it will be observed that each of the lugs 24 and 25 is provided with a number of annular grooves or depressions 52. In Figs. 6, 7, and 8, I have shown a form of clip which is peculiarly well adapted for use in connecting the wires to the terminal lugs 24 and 25. Fig. 7 shows the blank from which the clip is formed. Said blank is stamped out to provide the curved end portions 53 and 54, each of which has the lugs or depressions 55 corresponding in spacing with the annular grooves 52 of the corresponding terminal lug. The blank is also formed with the central finger 56 on one side, and the fingers 57 and 58 on the other side of the blank. The material between the various fingers is cut away. The blank is then bent upon itself, as shown in Fig. 8, and the fingers 56, 57, and 58 are bent into the form shown in said figure. The fingers 57 and 58 embrace the finger 56. Furthermore, the rear ends 59 and 60 of the fingers are bent outwardly. Upon compressing the ends 59 and 60 toward each other, the fingers will be forced across each other so as to open up a space 61 into which the wire may be introduced. Simultaneously the end portions of the clip will spread apart so that the clip may be inserted onto the terminal lug. Upon releasing the end portions 59 and 60 of the fingers, the resiliency of the clip will cause the wire to be gripped between the fingers and will also cause the end portions 53 and 54 of the clip to firmly engage the terminal lug.

I have previously explained that on account of the capillary attraction and the hygroscopic nature of the separating material, the electrolyte is distributed in substantially uniform manner throughout all portions of the cell. Consequently, the said electrolyte at all times substantially emerses the upper portions of the electrodes. The result is that whenever any gassing takes place, the said gas is condensed by the glass wool, so that there is no loss of electrolyte, which otherwise would be mechanically removed by the ascending gas. The surface of the glass wool, in immediate contact with the electrodes, offers a very large number of points upon which the gas is deposited and carried away by the capillary action of the mass thus tending to obviate polarization phenomena.

While I have herein shown and described only a single embodiment of my invention, still it will be understood that I do not limit myself to the same except as I may limit myself in the claims.

I claim:

1. In a secondary cell, the combination with a cylindrical container, of an active element within the same, said active element comprising a pair of electrodes and an intermediate layer of separating material in conjunction with filling material at both the upper and lower ends of the container, the electrodes being spiraled together with their inner ends in close proximity, and the separating material comprising a layer of glass wool completely separating the electrodes at all points and being tightly compressed between the electrodes, the upper and lower edges of the layer of glass wool projecting beyond the upper and lower edges of the electrodes to thereby provide the filling material aforesaid, a terminal connected to each electrode, and electrolyte completely saturating the layer of glass wool, whereby the glass wool serves to separate the electrodes from each other, while at the same time carrying the electrolyte into intimate contact with all portions of the active faces of the electrodes, substantially as and for the purpose set forth.

2. In a secondary cell, the combination with a cylindrical container, of an active element within the same, said active element comprising a pair of electrodes and an intermediate layer of separating material, the electrodes being spiraled together with their inner ends in close proximity, and the separating material comprising a layer of glass wool completely separating the electrodes at all points and being tightly compressed between the electrodes, a terminal connected to each electrode, and electrolyte completely saturating the separating material, whereby the glass wool serves to separate the electrodes from each other, while at the same time carrying the electrolyte into intimate contact with all portions of the active faces of the electrodes, substantially as and for the purpose set forth.

3. In a secondary cell, the combination with a container, of an active element within the same, said active element comprising two electrode sheets and an intermediate layer of separating material tightly spiraled together, the separating material being glass wool and completely separating the electrodes at all points, and electrolyte completely saturating the glass wool and wetting all faces of the electrodes, the capillary capacity of the glass wool carrying the electrolyte into contact with substantially all portions of the faces of the electrodes, substantially as and for the purpose set forth.

JULIUS BECKER.

Witnesses:
    Thomas A. Banning, Jr.,
    Albie E. Kloboucnik,